(12) United States Patent  (10) Patent No.: US 7,399,221 B2
Masumoto et al.  (45) Date of Patent: Jul. 15, 2008

(54) CABIN FOR WORK VEHICLE

(75) Inventors: Koji Masumoto, Sakai (JP); Kenzo Ushiro, Sakai (JP)

(73) Assignee: Kubota Corporation, Osaka (JP)

( * ) Notice: Subject to any disclaimer, the term of this patent is extended or adjusted under 35 U.S.C. 154(b) by 45 days.

(21) Appl. No.: 11/353,857

(22) Filed: Feb. 14, 2006

(65) Prior Publication Data

US 2006/0246834 A1 Nov. 2, 2006

(30) Foreign Application Priority Data

Mar. 14, 2005 (JP) ............................. 2005-070842

(51) Int. Cl.
*B60H 1/34* (2006.01)
(52) U.S. Cl. ...................... 454/155; 454/154; 454/70; 244/118.5
(58) Field of Classification Search ............... 454/70, 454/73, 74, 75, 76, 154, 155; 244/118.5
See application file for complete search history.

(56) References Cited

U.S. PATENT DOCUMENTS

| 2,056,757 | A | * | 10/1936 | Adamcikas | 454/286 |
| 2,730,866 | A | * | 1/1956 | Baker et al. | 62/180 |
| 2,747,495 | A | * | 5/1956 | Muller | 454/154 |
| 2,885,943 | A | * | 5/1959 | Divizia | 454/154 |
| 3,264,971 | A | * | 8/1966 | Dangauthier | 454/154 |
| 3,555,846 | A | * | 1/1971 | Harbeck et al. | 62/244 |
| 3,559,559 | A | * | 2/1971 | Furlong et al. | 454/73 |
| 3,974,752 | A | * | 8/1976 | Burgess et al. | 454/73 |
| 4,130,051 | A | * | 12/1978 | Brudnicki | 454/73 |
| 4,509,681 | A | * | 4/1985 | Kogut | 237/53 |
| 4,633,770 | A | * | 1/1987 | Taylor et al. | 454/202 |
| 5,312,072 | A | * | 5/1994 | Eklund | 244/118.5 |
| 5,472,645 | A | * | 12/1995 | Rock et al. | 261/79.1 |
| 5,512,216 | A | * | 4/1996 | Rock et al. | 261/79.1 |

(Continued)

FOREIGN PATENT DOCUMENTS

DE 27 24 019 A1 5/1977

(Continued)

*Primary Examiner*—Derek S Boles
(74) *Attorney, Agent, or Firm*—The Webb Law Firm (57) ABSTRACT

A cabin for a work vehicle, comprising: a ceiling portion; an air conditioner provided to the work vehicle; an air distribution duct provided to the ceiling portion for communicating conditioned air from the air conditioner to the cabin; an air guide projecting into the air distribution duct at an intermediate portion of the duct and forming an inlet opening in a lateral face of a projecting portion of the air guide; and an outlet portion extending to outside the duct and having an opening for introducing the conditioned air from the inlet opening into the cabin. The air guide is pivotable between a use condition and a non-use condition where the inlet opening is oriented differently from an orientation of the inlet opening when the air guide is in the use condition. The air guide is pivotable about an axis such that the inlet opening of the air guide assumes an upstream orientation with respect to a direction of air flow within the air distribution duct when the air guide is in the use condition whereas the inlet opening of the air guide assumes a downstream orientation with respect to the direction of air flow within the air distribution duct when the air guide is in the non-use condition.

11 Claims, 7 Drawing Sheets

U.S. PATENT DOCUMENTS

| | | | |
|---|---|---|---|
| 5,520,578 A * | 5/1996 | Bloch et al. | 454/74 |
| 5,588,910 A * | 12/1996 | Hutter et al. | 454/154 |
| 5,643,080 A * | 7/1997 | Kondoh et al. | 454/155 |
| 5,911,624 A * | 6/1999 | Stauffer | 454/158 |
| 6,004,202 A * | 12/1999 | McCorkel et al. | 454/137 |
| 6,514,138 B2 * | 2/2003 | Estepp | 454/229 |
| 6,629,886 B1 * | 10/2003 | Estepp | 454/229 |
| 6,663,483 B2 * | 12/2003 | Nishimori et al. | 454/155 |

FOREIGN PATENT DOCUMENTS

| | | |
|---|---|---|
| DE | 197 33 469 C1 | 8/1998 |
| GB | 1 598 029 | 9/1981 |
| JP | 2001-280683 | 10/2001 |

* cited by examiner

CABIN FOR WORK VEHICLE

BACKGROUND OF THE INVENTION

The present invention relates to a cabin for a work vehicle having an air outlet for feeding conditioned air from an air distribution duct into the cabin.

Conventionally, for use in a vehicle, as shown in the Japanese Patent Application "Kokai" No. 2001-280683 (paragraphs [0002], [0027] and FIGS. 2-8), there is known an air conditioning technique wherein a shutter damper or a wind deflector is provided at an outlet of conditioned air, such that by opening/closing or changing orientation of the shutter damper or wind deflector, conditioned air may be supplied in a controlled manner to a desired area or not supplied at all when desired.

When e.g. fogging occurs on a glass sheet in the driver's cabin, this can sometimes impair the visibility of a sideview mirror located outside the cabin. In such case, by feeding conditioned air to the surface of fogged glass sheet, the air can eliminate the fogging or provide anti-fogging effect to the glass sheet, thus improving the visibility of the sideview mirror.

When the above-described conventional technique designed to allow controlled feeding of conditioned air to a desired portion or stopping the feeding of air thereto at all is to be employed, this would tend to invite increased complexity of the construction due to the requirement of such component as the shutter damper or the wind deflector as well as the requirement for allowing the pivotal operation of the dumper or deflector. Further, in order to allow the conditioned air to be supplied to the desired portion with high precision, correspondingly high precision would be required in the guiding performance of the wind deflector or the like, which would invite further complexity in the construction.

SUMMARY OF THE INVENTION

In view of the above-described state of the art, a primary object of the present invention is to provide a driver's cabin construction which allows controlled feeding or decreased feeding of the conditioned air in a simple manner.

For accomplishing the above-noted object, according to the present invention, a cabin for a work vehicle comprises: a ceiling portion; an air conditioner provided to the work vehicle; an air distribution duct provided to the ceiling portion for communicating conditioned air from the air conditioner to the cabin; an air guide projecting into the air distribution duct at an intermediate portion of the duct and forming an inlet opening in a lateral face of a projecting portion of the air guide; and an outlet portion extending to outside the duct and having an opening for introducing the conditioned air from the inlet opening into the cabin. The air guide is pivotable between a use condition and a non-use condition where the inlet opening is oriented differently from an orientation of the inlet opening when the air guide is in the use condition. The air guide is pivotable about an axis such that the inlet opening of the air guide assumes an upstream orientation with respect to a direction of air flow within the air distribution duct when the air guide is in the use condition whereas the inlet opening of the air guide assumes a downstream orientation with respect to the direction of air flow within the air distribution duct when the air guide is in the non-use condition.

DETAILED DESCRIPTION OF PREFERRED EMBODIMENTS

Next, preferred embodiments of the present invention will be described in details with reference to the accompanying drawings.

Figure 1:
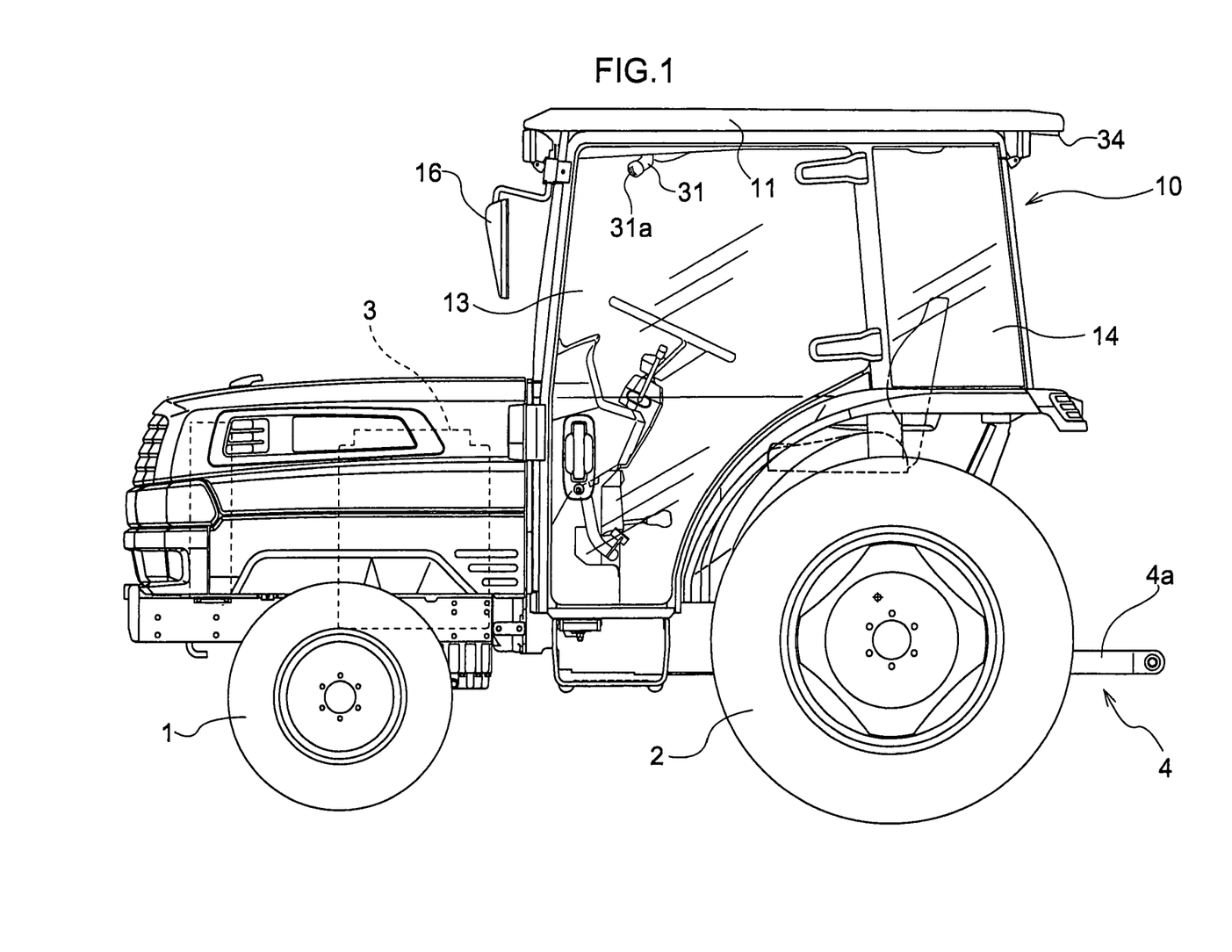
FIG. 1 is a side view showing a tractor in its entirety.

As shown in FIG. 1, a tractor, as an example of a work vehicle, includes a pair of right and left steerable and drivable front wheels 1 and a pair of right and left drivable rear wheels 2 for self-propelling of the vehicle body, an engine section including an engine 3 mounted at a front portion of the vehicle body, and a vehicle frame including a driver's section having a driver's cabin 10. At a rear portion of the vehicle frame, there is provided a link mechanism 4 having such components as a pair of right and left lower inks 4a. The link mechanism 4 allows operable connection of various utility implements to the rear portion of the vehicle body. For instance, a rotary tiller (not shown), as an example of implement, can be operably connected to be lifted up/down by the link mechanism 4. With attachment and operable connection of such various implements thereto, the tractor can be converted into a variety of work vehicles.

Figure 2:
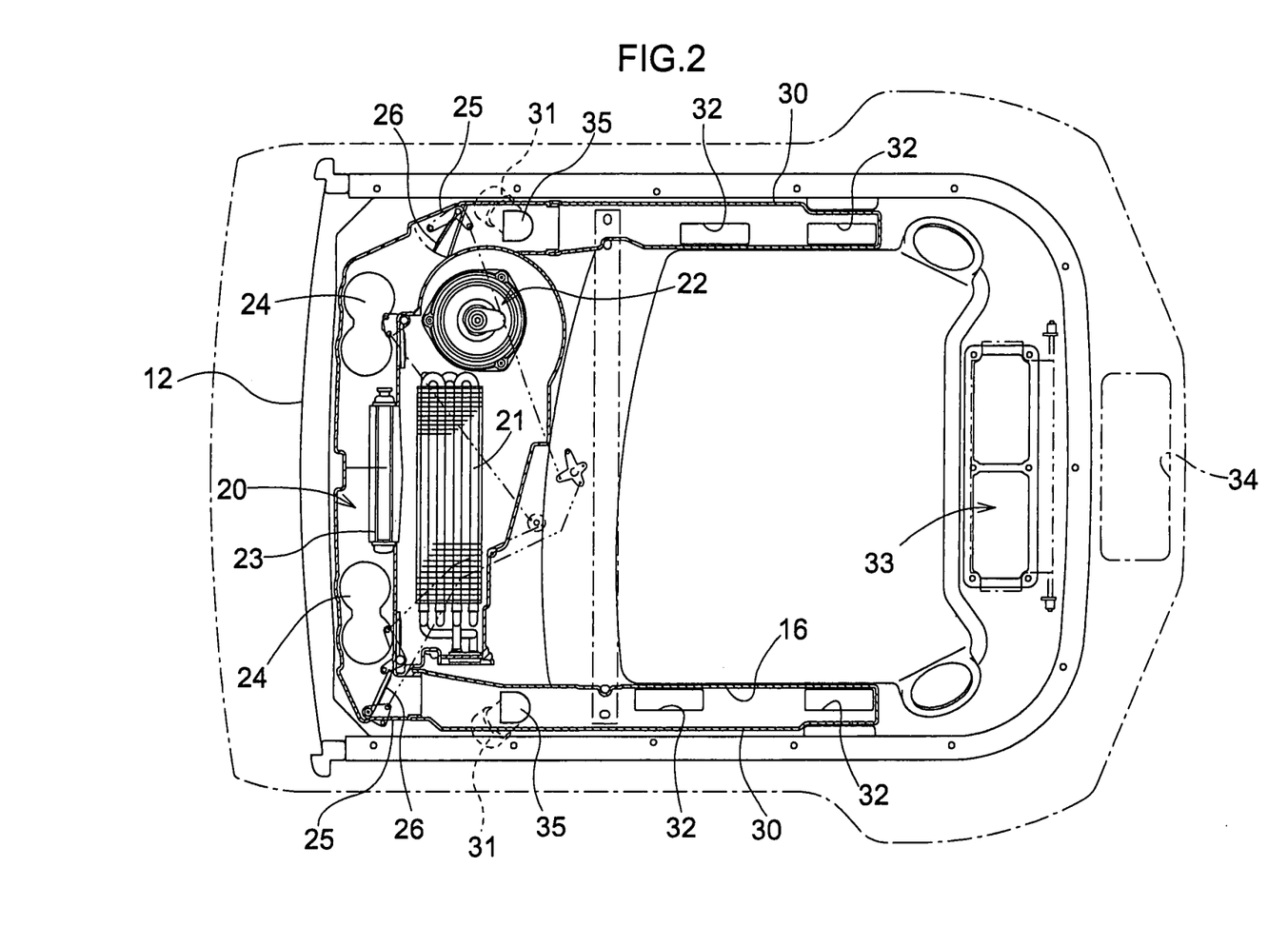
FIG. 2 is a section of an air conditioning system.
Figure 3:
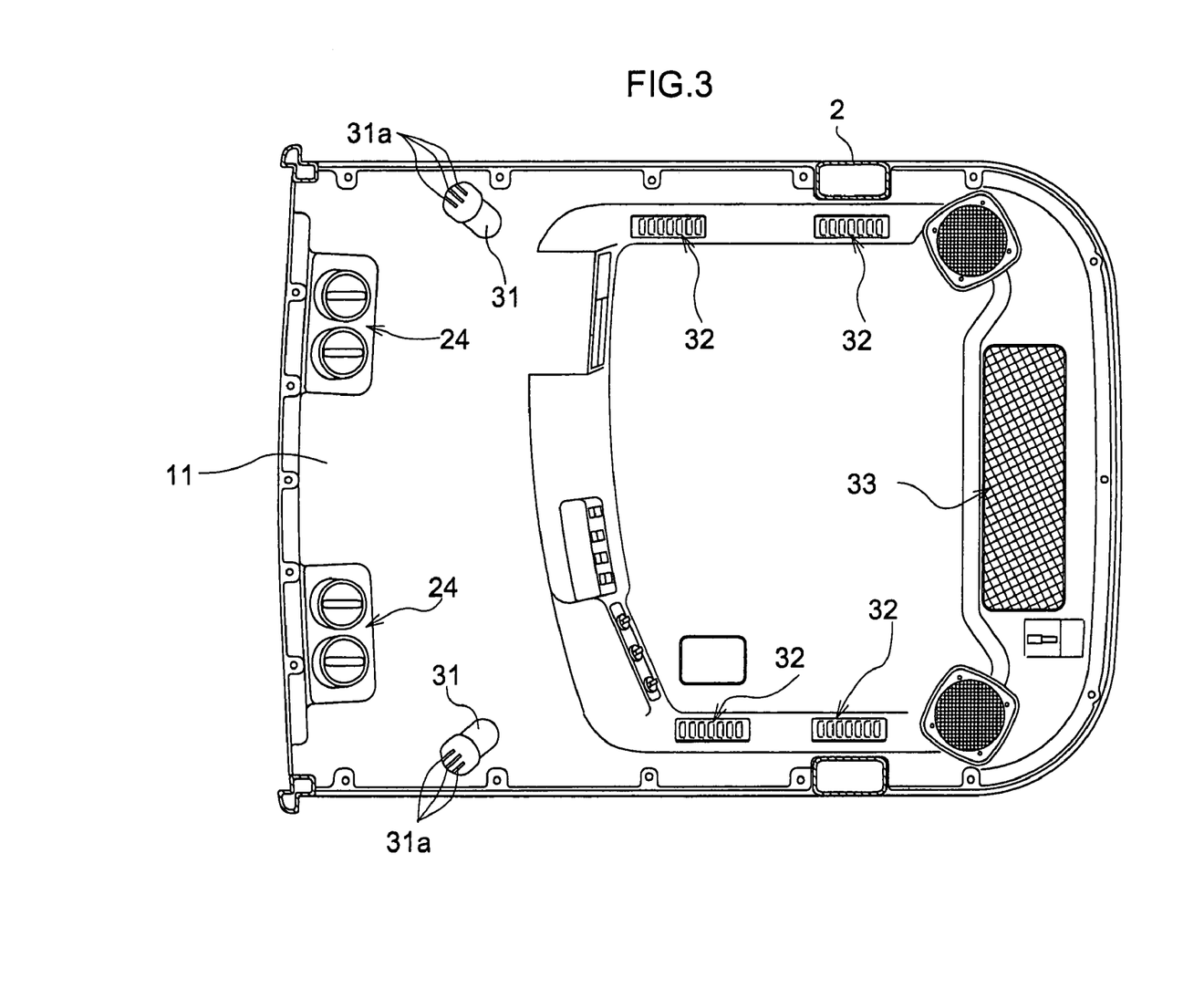
FIG. 3 is a bottom view of a ceiling portion, showing a ceiling face as seen from inside of a driver's cabin.
Figure 4:
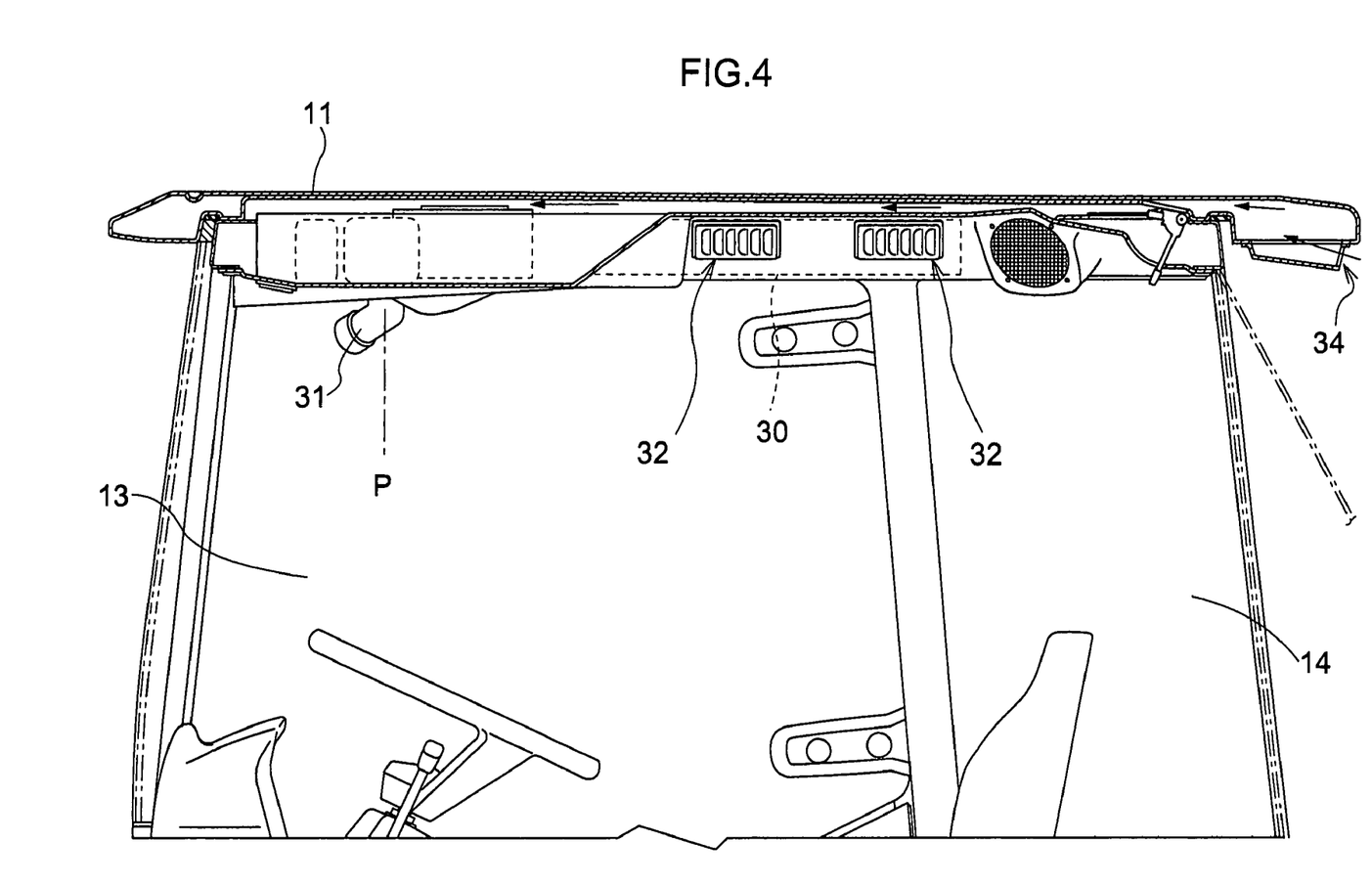
FIG. 4 is a side view in vertical section of the ceiling portion.

As shown in FIGS. 2, 3 and 4, there is provided also an air conditioning system. This air conditioning system includes: an air conditioner 20 having such components as an evaporator 21 disposed inside a ceiling portion 11 of the driver's cabin 10 at a front end of the cabin, a rotary fan 22, a heater 23 and front outlet members 24 opened to the inside of the driver's cabin 10 at the front end of the ceiling portion 11; a pair of right and left air distribution ducts 30 having respective front ends thereof communicated with air outlet openings 25 provided on opposed ends of the air conditioner 20 relative to the lateral direction of the cabin; outlet members 31, 32 provided at a plurality of positions of the respective air distribution ducts 30 in distribution along the fore-and-aft direction of the cabin and opened into the driver's cabin 10; a circulating opening 33 provided at an end of the ceiling portion 11 adjacent the rear end of the cabin and opened into the driver's cabin 10; an ambience air inlet opening 34 provided at the rear end of the ceiling portion 11 and opened to the outside of the driver's cabin.

The air conditioning system is provided for air conditioning for the purpose of cooling or heating the inside of the driver's cabin 10. This system operates as follows.

When the air conditioner 20 is operated, in association of suctioning and blowing functions of the rotary fan 22, the air conditioner 20 draws in air present inside the driver's cabin through the circulating opening 33 and/or air present outside the cabin through the ambient air inlet opening 34 and feeds it to the evaporator 21 or the heater 23. The air is subjected to a heat exchange through the evaporator 21 or the heater 23 to be converted into conditioned air for cooling or heating. Then, this conditioned air is discharged through the front outlet members 24 to the vicinity of a front windshield (glass sheet) 12 inside the driver's cabin 10. Further, when pivotable dampers 26 provided at the respective outlet members 25 of the air conditioner 20 are pivotally opened, the conditioned air generated by the air conditioner 20 is fed into the respective air distribution ducts 30, and the conditioned air flowing through each air distribution duct 30 from the front end to the rear ends thereof is discharged through the respective outlet portion 31, 32 to the vicinity of a side door glass sheet 13 or a side wall glass sheet 14 (see FIG. 1) inside the driver's cabin 10.

Figure 5:
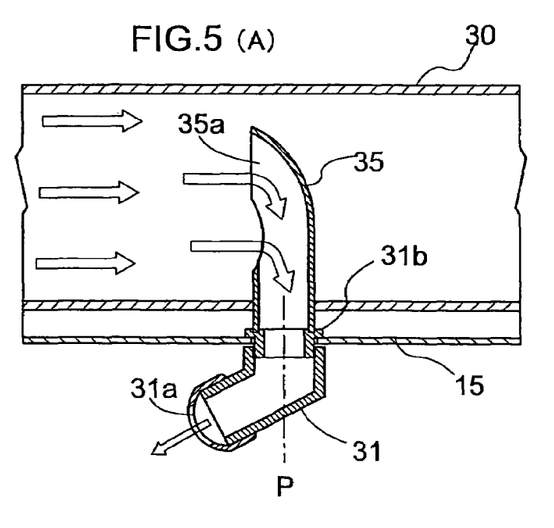
FIG. 5(A) is a section showing an outlet member and an air guide under a use condition of the outlet member.
FIG. 5(B) is an explanatory view illustrating the use condition of the outlet member.
FIG. 5(C) is a section showing the outlet member and the air guide under a non-use condition of the outlet member.
FIG. 5(D) is an explanatory view illustrating the non-use condition of the outlet member.

As shown in FIG. 5, of the plurality of outlet members 31, 22 provided to the respective air distribution ducts 30, each of the outlet members 31 disposed at the front-most position of the cabin includes a plurality of outlet holes 31a in the form of slits and this outlet member, as a whole, is constructed as a tubular member which is pivotally supported to an inner roof 15 via a mounting tubular portion 31b.

With the above-described construction in operation, as the outlet portion 31 provided at the front-most end of each air distribution duct 30 is pivoted in one direction or the other about an axis P of the mounting tubular portion 31b extending along the vertical direction of the cabin, the outlet portion 31 is selectively brought into a use condition as shown in FIG. 5(B) where the portion 31 is directed toward the lateral outer side of the cabin to orient the outlet holes 31a thereof toward a portion of the side door glass sheet 13 adjacent a sideview mirror 16 or into a non-use condition as shown FIG. 5(C) where the outlet holes 31 are pivoted about 180 degrees from their positions under the use condition to be oriented toward the inner side of the cabin.

As may be clearly seen in FIG. 5, each front-end outlet portion 31 is provided with an air guide 35 comprised of a tubular member extending from the mounting tubular portion 31b to the inside of the air distribution duct 30 and having, at its extension extreme end, an inlet opening 35a located inside the air distribution duct 30.

When the outlet portion 31 is in its use condition, the air guide 35 is also said to be in its use condition whereas when the outlet portion 31 is in its non-use condition, the air guide 35 is also said to be in its non-use condition.

The air guide 35 is connected to the outlet portion 31 in such a manner that the air guide 35 can be pivoted about the axis P together with the outlet portion 31 relative to the inner roof 15 and the air distribution duct 30. More particularly, this air guide 35 includes a lower portion extending substantially linearly along the axis P and an upper portion projecting into the air distribution duct 30 and having the inlet opening 35a. Whereas, the outlet portion 31 includes an upper portion extending substantially linearly along the axis P and a lower portion extending with a predetermined angle relative to the upper portion and having the outlet openings.

As may be understood in the plan view of FIG. 2, the opening direction of the inlet opening 35a of the air guide 35 differs from the opening direction of the outlet portion 31, with the opening direction of the outlet portion 31 being offset about 45 degrees to the outer side relative to the opening direction of the inlet opening 35a.

FIG. 5(A) shows the air guide 35 when the outlet portion 31 is operated to the use condition, whereas FIG. 5(C) shows the air guide 35 when the outlet portion 31 is operated to the non-use condition. As shown, the air guide 35 and the outlet portion 31 are connected to each other such that when the outlet portion 31 is under the use condition, the inlet opening 35a of the air guide 35 assumes an upstream orientation relative to the movement of the air flowing through the air distribution duct 30, whereas, when the outlet portion 31 is under the non-use condition, the inlet opening 35a of the air guide 35 assumes a downstream orientation relative to the movement of the air flowing through the air distribution duct 30. Here, the language "upstream orientation" should be taken broadly to as an orientation including components opposite to the air flowing direction. In the instant embodiment, if the air flowing direction (corresponding to the rear side of the tractor in this embodiment) is 0 degrees in the direction in the plan view, the "upstream orientation" refers to an angular range from 90° to 270° including 180°. Likewise, the language "downward orientation" refers to an angular range from 270° to 90° including 0°. More preferably, when the outlet portion 31 is under the use condition, the inlet opening 35a of the air guide 35 should be within an angular range from 135° to 225° including 180° relative to the air flowing direction of the air distribution duct 30; and when the outlet portion 31 is under the non-use condition, the inlet opening 35a of the air guide 35 should be within an angular range from 315° to 45° including 0° relative to the air flowing direction of the air distribution duct 30. Even more preferably, when the outlet portion 31 is under the use condition, the inlet opening 35a of the air guide 35 should be within an angular range degrees from 150° to 210° including 180° relative to the air flowing direction of the air distribution duct 30; and when the outlet portion 31 is under the non-use condition, the inlet opening 35a of the air guide 35 should be within an angular range 330° to 30° including 0° relative to the air flowing direction of the air distribution duct 30. In this particular embodiment, when the outlet portion 31 is under the use condition, the inlet opening 35a of the air guide 35 is at the angular position 180° relative to the air flowing direction of the air distribution duct 30; and when the outlet portion 31 is under the non-use condition, the inlet opening 35a of the air guide 35 is at the angular position of 0° relative to the air flowing direction of the air distribution duct 30.

Referring now to the function of the above-described construction, when there occurs fogging on the side door glass sheet 13, the outlet portion 31 is pivoted to the use condition as shown in FIG. 5(B). Then, the conditioned air flowing within the air distribution duct 30 is smoothly introduced into the inlet opening 35a of the air guide 35, then, this conditioned air is guided by the air guide 35 to flow to the outlet portion 31 and the air is eventually discharged through the respective outlet holes (slits) 31a of the outlet portion 31, whereby the conditioned air is fed to the portion of the side door glass sheet 13 adjacent the sideview mirror 16. As a result, the conditioned air thus fed eliminates the fogging on the side door glass 13 or provides an anti-fogging effect thereto, thus improving the visibility of the sideview mirror 16.

In the course of the above, if the orientation of the outlet portion 31 is adjusted within a range not too deviated from the portion of the side door glass 13 adjacent the sideview mirror 16, the orientation of the inlet opening 35a of the air guide 35 will be varied within a range slightly offset laterally relative to the air distribution duct 30, whereby the amount of the conditioned air introduced in the inlet opening 35a of the air guide 35 may be increased or decreased accordingly. Hence, the amount of the conditioned air to be supplied to the portion of the side door glass sheet 13 adjacent the sideview mirror 16 may be adjusted appropriately.

When such defogging of the side door glass 13 is not needed, the outlet member 13 is pivoted to the non-use condition. Then, this restricts the amount of conditioned air flowing through the air distribution duct 30 to be introduced into the inlet opening 35*a*. Further, even if some amount of conditioned air enters the air guide 35, this air will not leak from the outlet portion 31 toward the side door glass sheet 13. Hence, the feeding of the conditioned air to the side door glass sheet 13 can be stopped. In this, as the introduction of the conditioned air flowing through the air distribution duct 30 is resisted as described above, the air will flow instead to the downstream side of the air guide 35, so that this conditioned air can be smoothly fed to the outlet members 32 disposed on the more rear side than the front-most outlet members 31.

Figure 6:
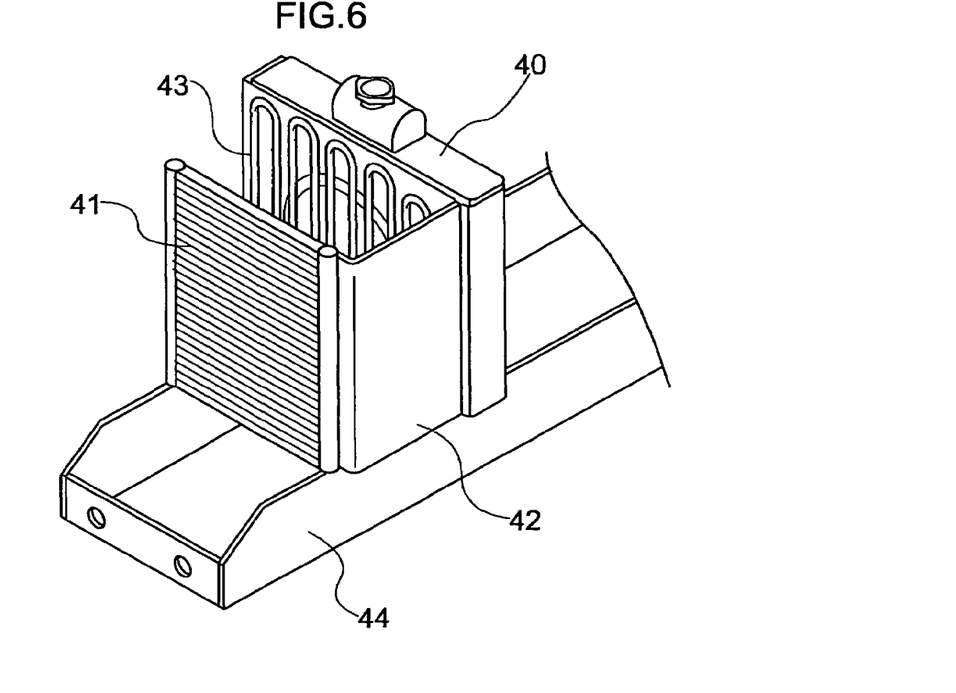
FIG. 6 is a perspective view showing a portion of an engine section where an engine cooling radiator and a condenser are disposed.

As shown in FIG. 6, of the opposed lateral sides of the condenser 41 mounted on an engine mounting frame 44 on the more front side of the vehicle body than the engine cooling radiator 40 of the engine section, on the lateral side opposite to the side where such components as a cooling medium supply pipe (not shown) connecting the condenser 41 with the air conditioner 20 are disposed, there is provided a shielding plate 42 which shields space between the condenser 41 and the engine cooling radiator 40.

That is, cooling air supplied to the engine cooling radiator 40 in association with the suction effect of the rotary fan (not shown) disposed rearwardly of the engine cooling radiator 40 may inadvertently flow into the radiator 40 from between the condenser 41 and the radiator 40 without passing the radiator 41. The shielding plate 42 restricts such inadvertent direct inflow of cooling air to the radiator 41. With this, the engine cooling air will reliably enter the condenser 41 from its front face and flow therethrough and then flow into the radiator 40. As a result, cooling of refrigerant or coolant gas within the condenser 41 can proceed in an efficient manner, whereby the air conditioner 20 can provide effective cooling effect.

Numeral 43 shown in FIG. 6 denotes an oil cooler.

Other Embodiments

In the foregoing embodiment, the pivotable outlet portion 31 is configured to discharge conditioned air toward the side door glass sheet 13. Instead, the pivotable outlet portion 31 can be configured to discharge conditioned air toward the front windshield glass sheet or the rear glass sheet. In such modified constructions too, the object of the present invention can be equally achieved. For this reason, the portion of the side door glass 13 adjacent the sideview mirror will be generically referred to as "air feeding target portion".

Figure 7:
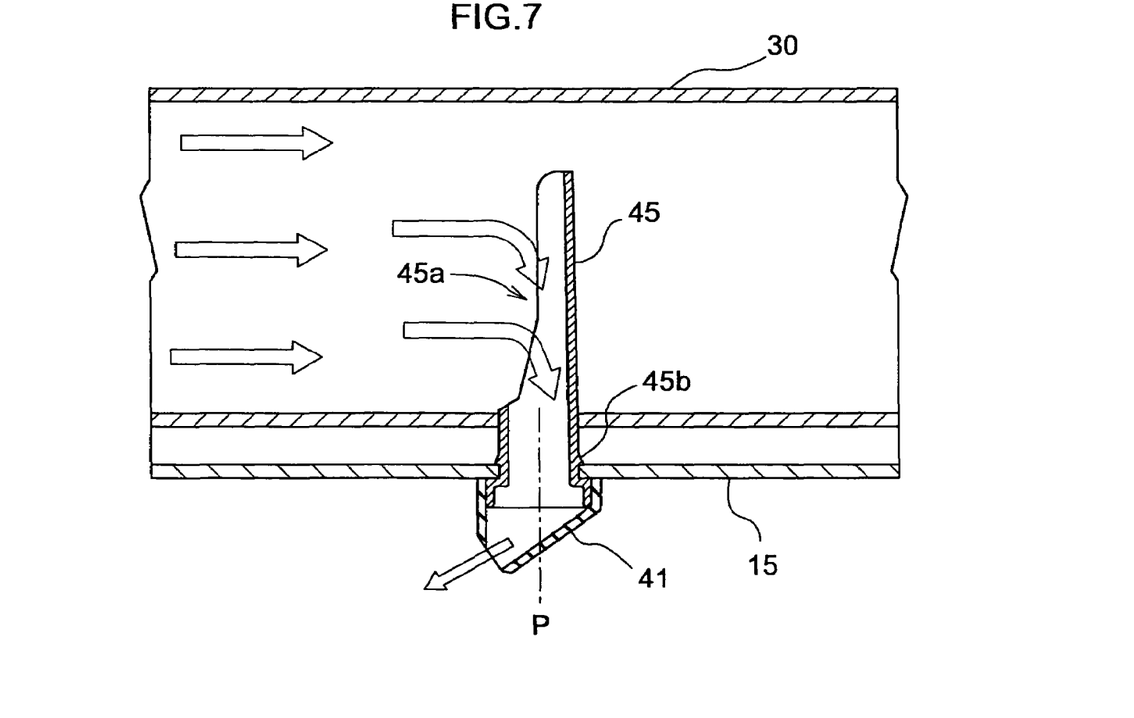
FIG. 7 is a sectional view of a different embodiment of the outlet portion and the air guide.
Figure 8:
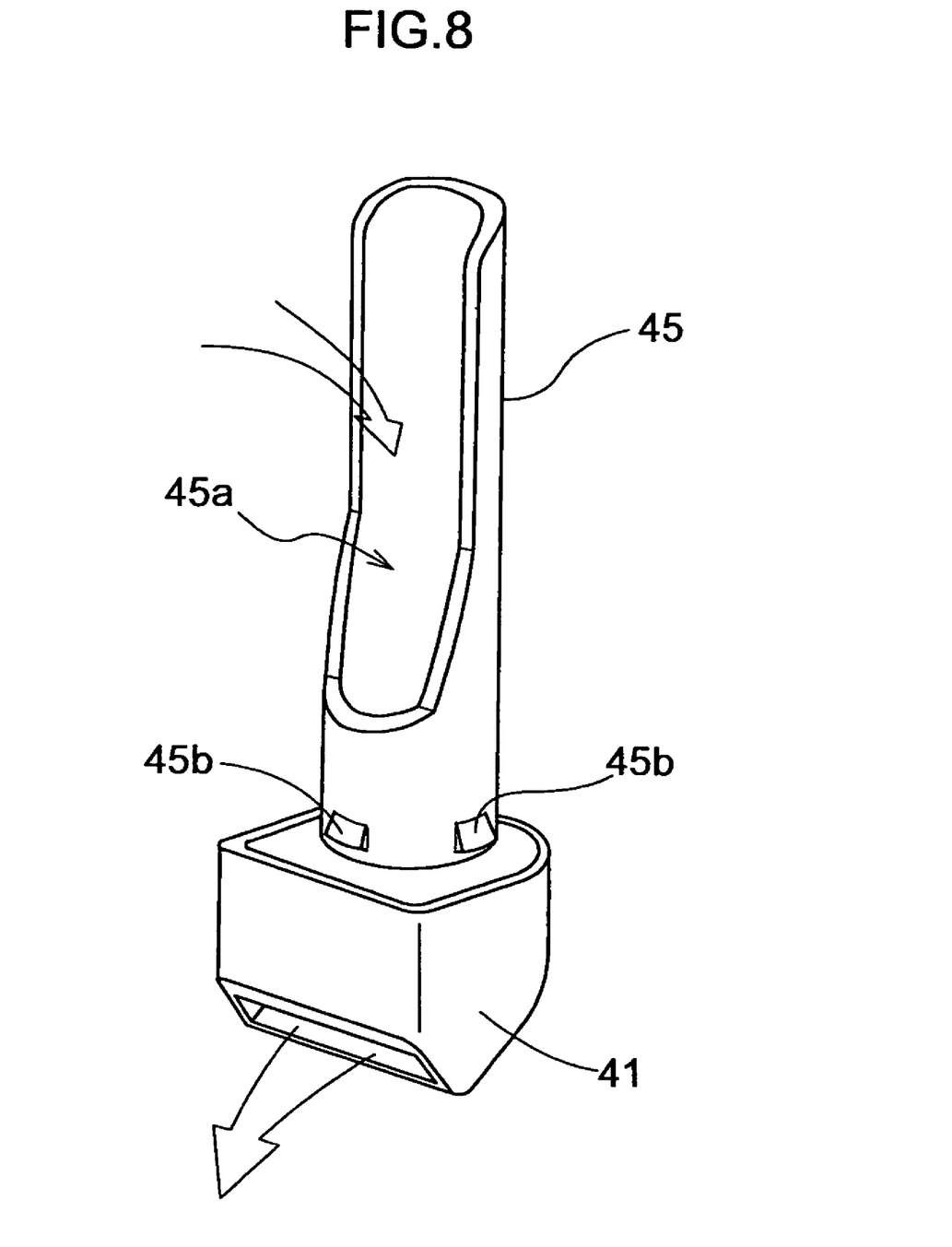
FIG. 8 is a perspective view of the different embodiment of the outlet portion and the air guide shown in FIG. 7.

FIGS. 7 and 8 illustrate an air guide 45 and an outlet portion 41 in accordance with another embodiment of the present invention. The air guide 45 extend substantially straight vertically and has an inlet opening 45*a*. The inlet opening 45*a* takes up at least half of the vertical length of the air guide 45. The lower portion of the air guide 45 engages the inner roof 15 and has projections 45*b* that are spaced apart circumstantially. The outlet portion 41 is attached to the lower end of the air guide 45 by mans of any known attachment means such as adhesive, or a bolt and nut arrangement. The air guide 45 and/or outlet portion 41 can be manufactured using any known suitable material such as resin, plastic or resilient material such as rubber. In the present embodiment, the outlet portion is made of rubber. The outlet portion 41 has an opening that extends generally horizontally as shown in FIG. 8. The horizontal width of the opening is preferably substantially greater than the vertical height of the opening. The horizontal width of the opening is at least twice, or preferably, four times as great as the vertical height of the opening.

In any of the embodiments described above, the inlet opening may open in the same direction in plan view as the opening of the outlet portion as shown in FIG. 8 while the inlet opening and the opening of the outlet portion may be oriented to point to substantially different directions, in plan view, as in the first embodiment.

The invention claimed is:

1. A cabin for a work vehicle, comprising:
   a ceiling portion;
   an air conditioner provided to the work vehicle;
   an air distribution duct provided to the ceiling portion for communicating conditioned air from the air conditioner to the cabin;
   an air guide projecting into the air distribution duct at an intermediate portion of the duct and forming an inlet opening in only one lateral face of a projecting portion of the air guide, the air guide having an axial direction; and
   an outlet portion extending to outside the duct and having an opening for introducing the conditioned air from the inlet opening into the cabin, the opening of the outlet portion is spaced apart from the inlet opening, the outlet portion being configured to guide flow of air ejected from the opening of the outlet portion to a blow direction having a directional component perpendicular to the axial direction and to maintain the blow direction in a predetermined relationship with a direction in which the inlet opening opens in a vertical view;
   wherein the air guide is pivotable between a use condition and a non-use condition where the inlet opening is oriented differently from an orientation of the inlet opening when the air guide is in the use condition; and
   wherein the air guide is pivotable about an axis such that the inlet opening of the air guide assumes an upstream orientation with respect to a direction of air flow within the air distribution duct when the air guide is in the use condition whereas the inlet opening of the air guide assumes a downstream orientation with respect to the direction of air flow within the air distribution duct when the air guide is in the non-use condition.

2. The work vehicle cabin according to claim 1, wherein the axis extends substantially vertically, and wherein when the air guide is in the use condition, the opening of the outlet portion is directed away from a straight forward direction to feed conditioned air generally toward a side view mirror.

3. The work vehicle cabin according to claim 1, wherein the outlet portion is a separate piece from the air guide and is connected to the air guide so as to be integrally rotatable therewith.

4. The work vehicle cabin according to claim 1, wherein the air guide includes a lower portion extending substantially straight along said axis and an upper portion projecting into the air duct and having the inlet opening.

5. The work vehicle cabin according to claim 4, wherein the outlet portion includes an upper portion extending along said axis and a lower portion extending at a predetermined angle relative to the upper portion and having the opening.

6. The work vehicle cabin according to claim 1, wherein the inlet opening of the air guide is oriented substantially different, in the vertical view, from the opening direction of the opening of the outlet portion.

7. The work vehicle cabin according to claim 1, wherein an area of the inlet opening is substantially greater than an area of the opening of the outlet portion.

8. The work vehicle cabin according to claim 7, wherein the area of the inlet opening is at least twice as great as the area of the opening of the outlet portion.

9. The work vehicle cabin according to claim 1, wherein the opening of the outlet portion generally extend horizontally and wherein the horizontal width of the opening is greater than the vertical height of the opening.

10. The work vehicle cabin according to claim 9, wherein the horizontal width of the opening is at least twice as great as the vertical height of the opening.

11. The work vehicle cabin according to claim 1, further comprising a projection provided to the air guide to prevent the air guide from moving in the axial direction while allowing the air guide to rotate about the axial direction.

* * * * *